United States Patent
Mo

(10) Patent No.: US 7,443,381 B2
(45) Date of Patent: Oct. 28, 2008

(54) REMOTE CONTROL DEVICE WITH BUTTON FOR NOTIFYING POINTER MOVEMENT MODE

(75) Inventor: Dong-il Mo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 10/746,869

(22) Filed: Dec. 29, 2003

(65) Prior Publication Data

US 2004/0222971 A1  Nov. 11, 2004

(30) Foreign Application Priority Data

Dec. 27, 2002  (KR) .................. 10-2002-0085448

(51) Int. Cl.
   *G09G 5/08* (2006.01)
(52) U.S. Cl. ...................... 345/157; 345/156
(58) Field of Classification Search ............... 345/156, 345/157, 160, 161, 163, 167, 169
   See application file for complete search history.

(56) References Cited

U.S. PATENT DOCUMENTS 5,701,141 A * 12/1997 Schmenk et al. ............ 345/157
5,774,114 A * 6/1998 Suzuki ...................... 345/157
5,844,634 A * 12/1998 Stacy ......................... 348/734
5,905,497 A * 5/1999 Vaughan et al. ............. 345/672
6,654,002 B1 * 11/2003 Yamaki ...................... 345/157

FOREIGN PATENT DOCUMENTS

JP  62-24777 A   2/1987
JP  2-254894 A  10/1990

* cited by examiner

*Primary Examiner*—Richard Hjerpe
*Assistant Examiner*—Tom V Sheng
(74) *Attorney, Agent, or Firm*—Sughrue Mion, PLLC

(57) ABSTRACT

A remote control unit for controlling a device such as an audio-visual system, and also selecting objects displayed on a screen of the device. The remote control unit includes a main function button unit for receiving an input to control functions of the device, a direction button unit for receiving an input to move a pointer on the screen of the device, and a movement mode change button unit for receiving an input to change the movement of the pointer between a focus movement mode and the cursor movement mode. The remote control unit also includes a controller that interfaces with the movement mode change button unit to determine whether movement of the pointer is to be in the focus movement mode or the cursor movement mode. The remote control unit allows movement of the pointer to a desired point of the screen without a mouse-type pointing apparatus.

7 Claims, 8 Drawing Sheets

602

REMOTE CONTROL DEVICE WITH BUTTON FOR NOTIFYING POINTER MOVEMENT MODE

This application claims the priority of Korean Patent Application No. 2002-85448, filed on Dec. 27, 2002, in the Korean Intellectual Property Office, the disclosure of which is incorporated herein in its entirety by reference.

BACKGROUND OF THE INVENTION

1. Field of the Invention

The present invention relates to a remote control device, and more particularly, to an improved remote control device with a button of controlling a pointer movement mode.

2. Description of the Related Art

As the functions of a television (TV) or a set top box (STB) have increased, new applications for using remote control devices with games or web browsing have been developed. Further, use of remote control devices with a mouse-type pointing device, such as a joy stick or a track ball, for hypermedia broadcast or data broadcast has been popular. Such a remote control device with a mouse-type pointing device is disclosed in U.S. Pat. No. 6,466,154 published on Oct. 15, 2002, and Japanese Laid-Open Patent Publication Nos. 2000-330700 published on Nov. 30, 2000 and 2002-140158 published on May 17, 2002.

Such a remote control device with a mouse-type pointing device enables convenient handling of pointers but it is expensive to manufacture.

Also, a remote control device united with a track ball mouse requires a flat board to roll the track ball thereon and is thus not convenient to use. A remote control device coupled with a joystick or an air ball is more convenient to use than the remote control with a track ball mouse, but it is also expensive to manufacture.

SUMMARY OF THE INVENTION

The present invention provides a simple structure remote control device with a mouse function.

The present invention also provides a pointer control method using such a remote control device.

According to an aspect of the present invention, there is provided a remote control device comprising direction indicating means for instructing a moving direction of a pointer which points out a selected object; a selection indicating means for instructing selection of an object pointed by the pointer which is moved by the direction indicating means; a movement mode change indicating means for indicating change of moving the pointer in response to an electrical signal corresponding to the moving direction instructed by the direction indicating means; and a modulation means for generating electric signals in response to the selection made by the direction indicating means, the selection indicating means, and the movement mode change indicating means.

According to another aspect of the present invention, there is provided a method of controlling movement of a pointer in a screen, in response to a command indicative of pointer direction provided by a remote control device and a pointer movement mode change command that allows change between a focus mode and a cursor mode, the method comprising: changing the pointer movement mode between the focus mode and the cursor mode when the movement mode change command is received; receiving the command indicative of pointer direction; searching for an object, which is positioned in a direction indicated in the received command indicative of pointer direction, from selectable items when the set movement mode is the focus mode, and moving the pointer to the searched object; and moving the pointer by a predetermined unit distance in the direction indicated in the command indicative of pointer direction when the set movement mode is the cursor mode.

Here, the pointer indicates a focus or a cursor that points out an object to be selected. In detail, the focus is a type of pointer that moves only on objects that can be selected, that is, it shows an object-dependent movement. The cursor is a kind of pointer that moves regardless of the position of an object, that is, it shows an object-independent movement. In particular, the focus is a bar-type pointer that is used on a top-down menu, a pop-up menu, and an on-screen menu, and thus, its color changes to differentiate selectable menu items from the other menu items.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference the accompanying drawings.

Figure 1:
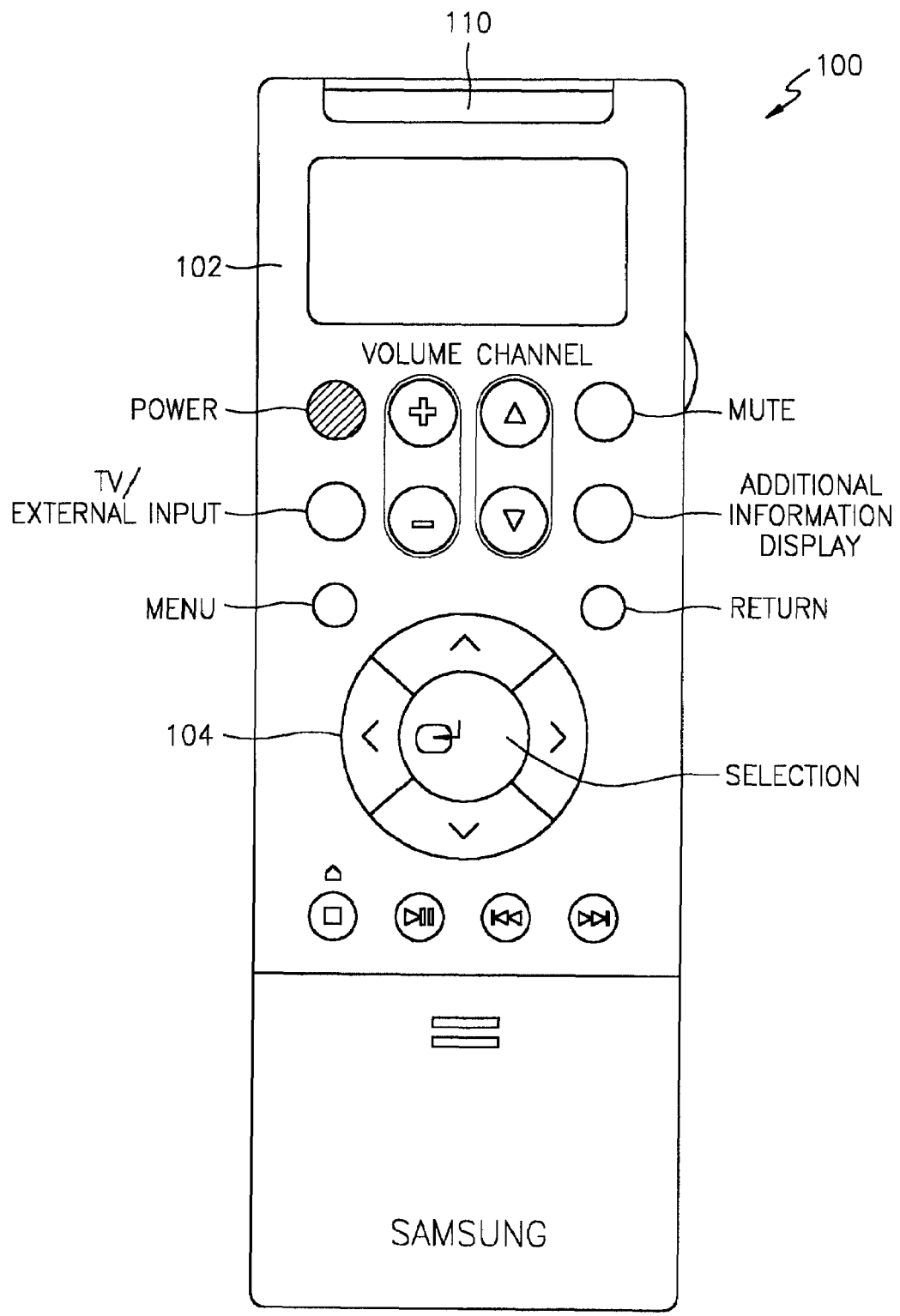
FIG. 1 is a front view of the exterior of a related art remote control device with no mouse functions.

FIG. 1 is a front view of the exterior of a related art remote control 100 with no mouse functions. Referring to FIG. 1, the remote control 100 includes a main function button unit 102 and a direction button unit 104 on its main body. A function control command is output in the form of an optical signal from a remote control signal transmitter 110, which is installed on a front end of the main body 100, by handling the button units 102 and 104.

Figure 2:
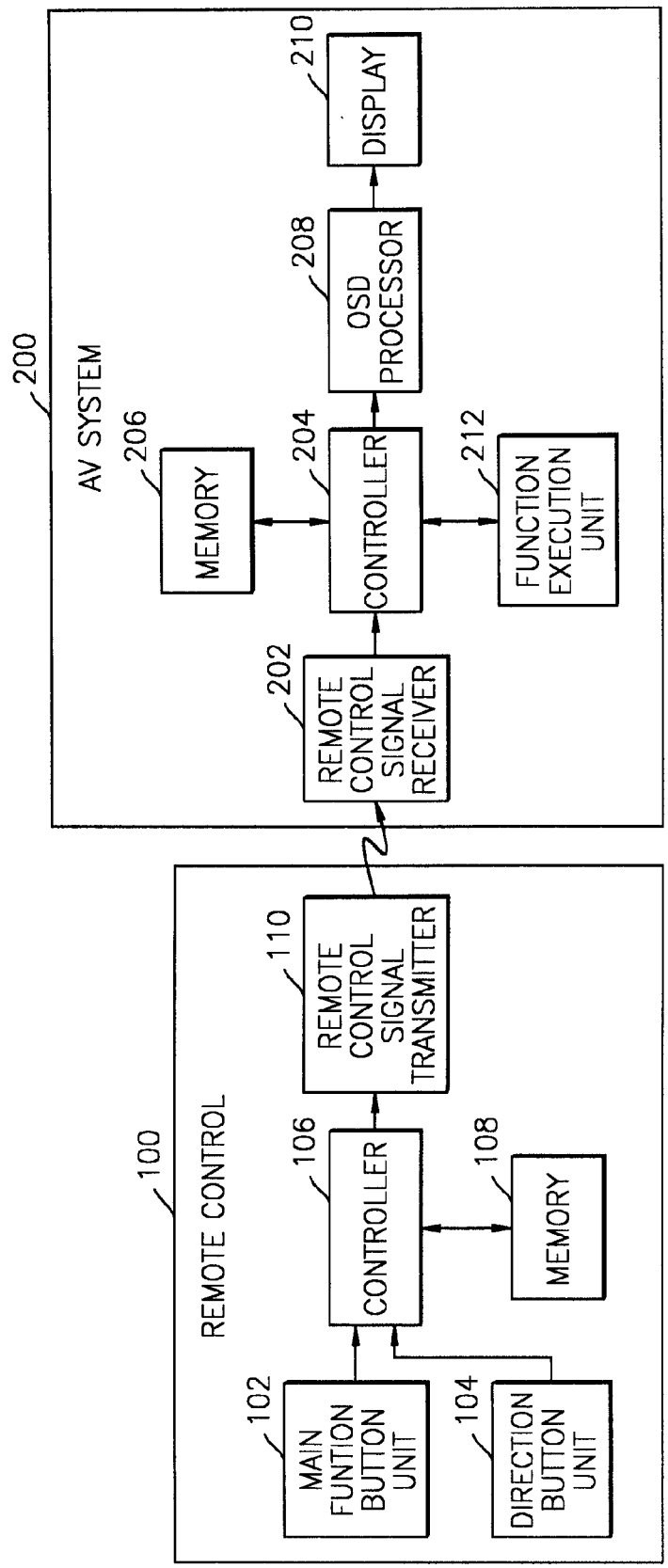
FIG. 2 is a block diagram illustrating circuit structures of the remote control device of FIG. 1, and an audio/video (AV) system controlled by the remote control device.

FIG. 2 is a block diagram of circuit structures of the remote control device 100 of FIG. 1 and an audio/video (AV) system 200 controlled by the remote control device 100. As shown in FIG. 2, the remote control device 100 includes the main function button unit 102, the direction button unit 104, a first controller 106, a memory 108, and a remote control signal transmitter 110.

A plurality of main function buttons included in the main function button unit 102 are used to control functions of the AV system 200 that are frequently used. The direction button unit 104 includes selection buttons, and buttons that allow pointer to move on a screen in left, right, upper, and lower directions.

The first controller 106 controls the remote control signal transmitter 110 to transmit a remote control signal to the AV system 200. When controlling the remote control signal transmitter 110, the first controller 106 refers to code information stored in the memory 108. The memory 108 stores code information regarding buttons included in the button units 102 and 104.

The AV system 200 is an electronic appliance, such as a home theater system including a digital video disc (DVD) player and a television, which can be remotely controlled, and is an image processing system capable of processing on-screen character or graphics. The AV system 200 includes a remote control signal receiver 202, a second controller 204, a memory 206, an on-screen display (OSD) processor 208, a display 210, and a function execution unit 212.

The remote control signal receiver 202 receives a remote control signal from the remote control signal transmitter 110 of the remote control device 100. If the remote control signal transmitter 110 is an infrared ray transmitter, the remote control signal receiver 202 is an infrared ray receiver. The received remote control signal is transmitted to the second controller 204.

The second controller 204 checks whether a code corresponding to the received remote control signal is registered with the memory 206. That is, the second controller 204 determines whether the AV system 200 can execute a function corresponding to the received remote control signal. Thus, code information corresponding to remote control signals related to the functions of the AV system 200 is stored in the memory 206. If a code corresponding to the received remote control signal is not stored in the memory 206, the second controller 204 ignores the received remote control signal.

If a code corresponding to the received remote control signal is stored in the memory 206, the second controller 204 controls the function execution unit 212 to carry out a function related to the remote control signal, based on the code read from the memory 206.

The function execution unit 212 is set to match the functions of the AV system 200. For instance, when the remote control 100 requests the AV system 200 to be turned off, the second controller 204 controls the function execution unit 212 to turn off power to devices included in the AV system 200. In FIG. 2, the function execution unit 212 is illustrated as a block for convenience but may include a plurality of devices that are categorized by the functions of the AV system 200.

The second controller 204 reads information required to perform a function or display the result of performing the function from the memory 206 and provides the read information to the OSD processor 208.

Based on the received information, the OSD processor 208 produces on-screen character information and sends the on-screen character information to the display 210. The on-screen character information is displayed on a screen of the display 210 so that a user can recognize it.

When a user inputs a command regarding movement of direction of a focus by pressing a direction key (or an arrow key) installed on the direction button unit 104 while looking at the display screen, the controller 202 moves a focus to a selectable menu item as instructed in the input command, and displays the focused menu item to be differentiated from other menu items so that the user can recognize it.

Figure 3:
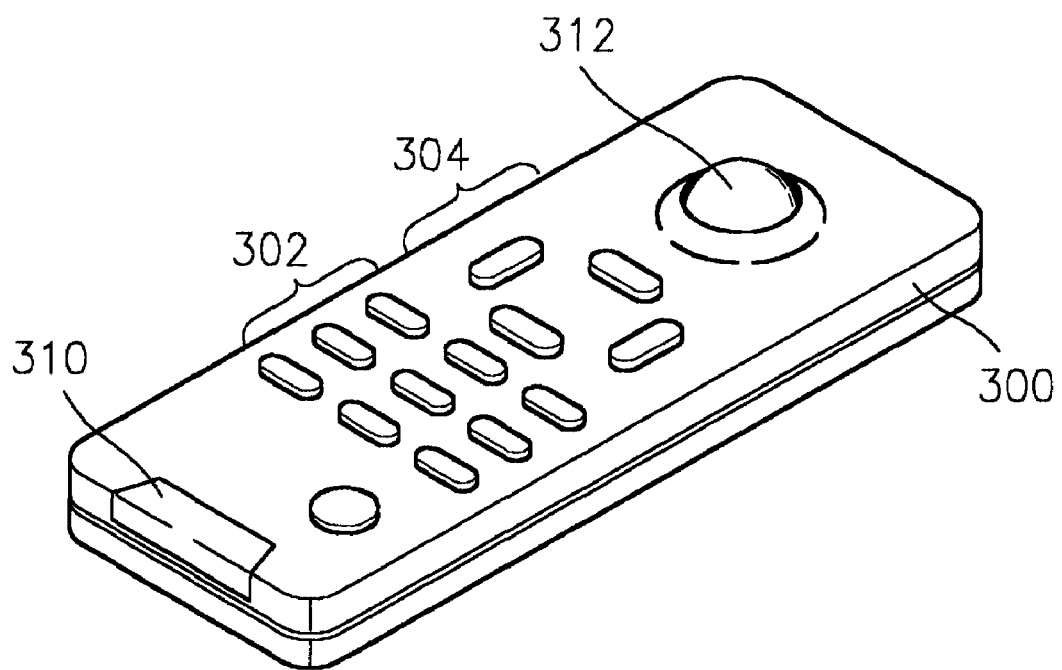
FIG. 3 illustrates an exterior of a related art remote control device.

FIG. 3 illustrates the exterior of a related art remote control device. Referring to FIG. 3, the related art remote control device is united with a mouse and includes a plurality of main function buttons 302 and a plurality of direction buttons 304 installed on a case body 300. Also, the related art remote control device further includes a track ball 312 allowing a cursor (not shown) to be freely moved on a screen. A function control command is given by controlling the plurality of buttons 302 and 304 and the track ball 312 and transmitted as an optical signal through a remote control signal transmitter 310 that is installed on a front and upper portion of the case body 300.

The transmitted optical signal is received by a receiver (not shown) installed on the case body 300. For instance, it is possible to turn on or off a television and control the various functions, e.g., channel change or volume change, of the television by handling the plurality of main function buttons 302.

In order to control the cursor, the track ball 312 is used with fingers of the user likewise when using a general mouse. Movement of the track ball 312 results in movement of the cursor to a desired point of the screen. Examples of a remote control devices united with a mouse, as shown in FIG. 3, are disclosed in U.S. Pat. No. 6,115,030, being directed to a remote control device including a track pointing apparatus with a movable stud, instead of a track ball, and Korean Laid-Open Patent Publication No. 2000-25970, being directed to a remote control device with a rubber switch instead of the track ball.

However, these remote control devices are expensive to manufacture since a mouse-type pointing apparatus such as a track ball and a joystick must be attached to their bodies.

Figure 4:
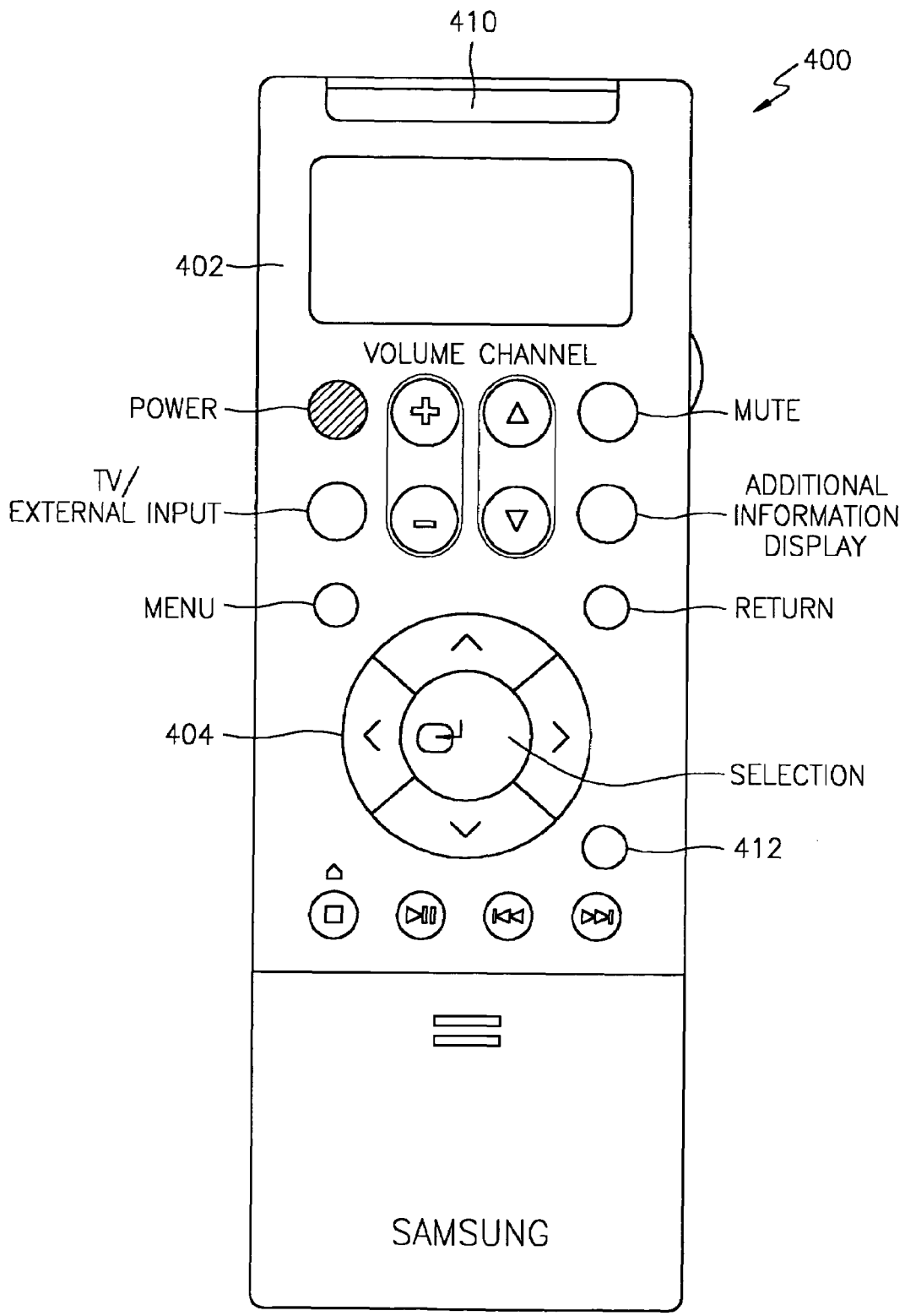
FIG. 4 is a front view of the exterior of a remote control device according to an exemplary embodiment of the present invention.

FIG. 4 is a front view of a remote control device 400 according to an exemplary embodiment of the present invention. Referring to FIG. 4, a plurality of main function buttons 402; a plurality of direction buttons 404 that indicate the direction of movement of a pointer in right, left, upper, and lower directions; and a movement mode change button 412 that allows change of pointer movement modes using the direction buttons 404, are installed on the remote control device 400.

A control command is given by pressing the main function buttons 402 and the direction buttons 404 and transmitted as an optical signal through a remote control signal transmitter 410 installed on a front and upper portion of the remote control device 400.

The optical signal is received by a receiver (not shown) on the body 400. For instance, it is possible to turn on or off a television and control its various functions, e.g., channel change and volume change, by pressing the main function buttons 402.

A pointer can be moved to a desired point of a screen using the direction buttons 404.

When the direction buttons 404 are pressed, a movement mode of the pointer on the screen is determined by using the movement mode change button 412. The movement mode change button 412 allows change between a focus mode and a cursor mode. The movement mode change button 412 acts as a toggle switch. Whenever pressing the movement mode change button 412, the focus mode is changed into the cursor mode and vice versa.

Here, the focus mode is a mode in which a pointer is moved only on selectable objects and the cursor mode is a mode in which the pointer is moved to a desired point of a screen irrespective of the position of an object. The focus mode is mainly used to select a menu item in a menu screen.

The remote control device 400 of FIG. 4 includes the movement mode change button 412 that allows change between the focus movement mode and the cursor movement mode. That is, moving and displaying of the pointer on the screen depends on a mode selected by the movement mode change button 412. In the cursor mode, the pointer can be easily moved to a desired point of the screen using the direction buttons 404 installed on the remote control device. A remote control device according to the present invention allows the pointer to be easily moved to a desired point of the screen without a mouse-type pointing apparatus, such as a track ball and a joy stick, which is attached to a related art remote control device, as if the pointer were moved using a mouse. Therefore, it is possible to manufacture a remote control device at a lower cost.

Figure 5A:
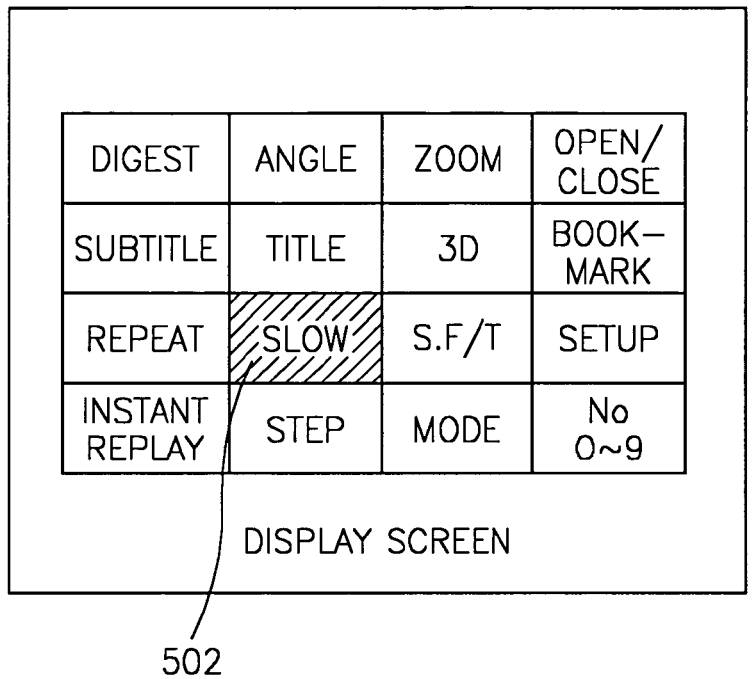
FIGS. 5A and 5B illustrate examples of an on-screen menu screen illustrating the movement of a pointer in a focus mode.
Figure 5B:
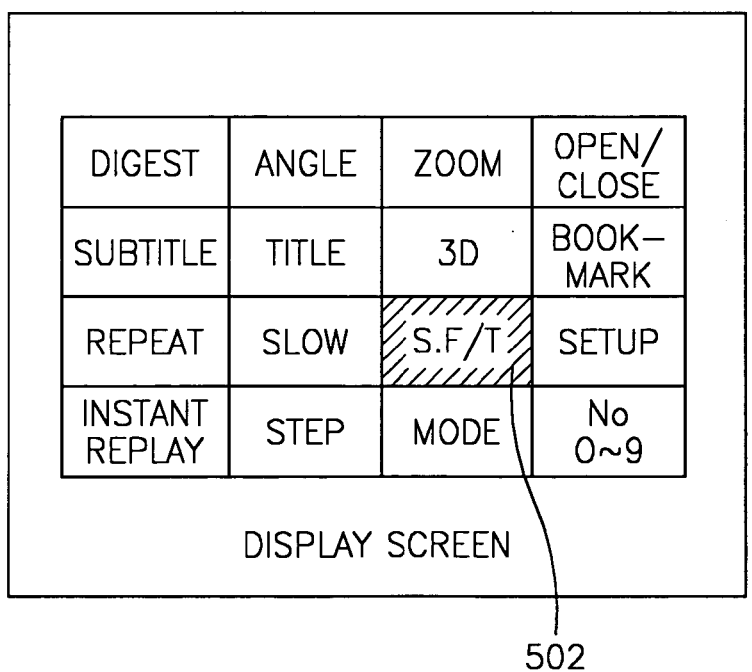

FIGS. 5A and 5B show examples of an on-screen menu screen for explaining movement of a pointer in the focus mode. In the menu screen of FIG. 5A, a plurality of selectable menu items are displayed. The selectable menu items are indicated with a different-color bar 502 to be differentiated from the other menu items. The bar 502 is called a focus (hereinafter referred to as 'focus 502'). The focus 502 is moved on the menu items using the direction buttons 404. For instance, when the focus shown in FIG. 5A is instructed to be moved in the right direction using the direction buttons 404, the focus is moved to a menu item S.F/T. Then, as shown in FIG. 5B, the color of a menu item SLOW is changed to be the same as those of the other menu items and the color of the menu item S.F/T is changed to be different from those of the other menu items. As shown in FIGS. 5A and 5B, the focus 502 is present only on the menu items, that is, it can be positioned neither beyond the menu items nor between the menu items.

Figure 6:
FIG. 6 illustrates a web page illustrating the movement of a pointer in a cursor mode.

FIG. 6 shows an example of a web page in which a pointer is moved in the cursor mode. In the web page, selectable objects may be hypertexts and hyper-linked drawings. In general, a hypertext is displayed as an underlined text. As shown in FIG. 6, a cursor 602 can be moved to a desired point of a screen, including on the selectable objects.

Figure 7:
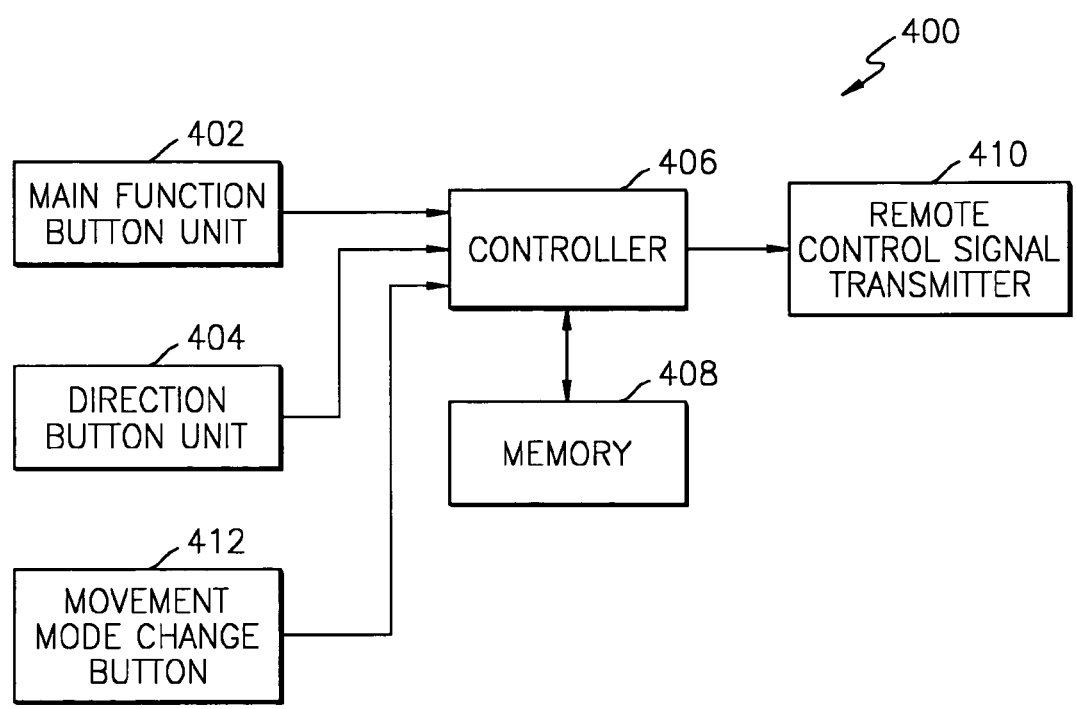
FIG. 7 is a block diagram of a circuit structure of the remote control of FIG. 4.

FIG. 7 is a block diagram illustrating a structure of the remote control device 400 of FIG. 4. Referring to FIG. 7, the remote control device 400 includes a main function button unit 402, a direction button unit 404, a controller 406 (modulation means), a memory 408, and a remote control signal transmitter 410. The main function button unit 402 and the direction button unit 404 are electrically connected to the controller 404.

The controller 404 determines which one of the main function button unit 402, the direction button unit 404, and the movement mode change button 412 is pressed, and controls the remote control signal transmitter 410 to generate an electric signal corresponding to the pressed button, based on data stored in the memory 408.

Figure 8:
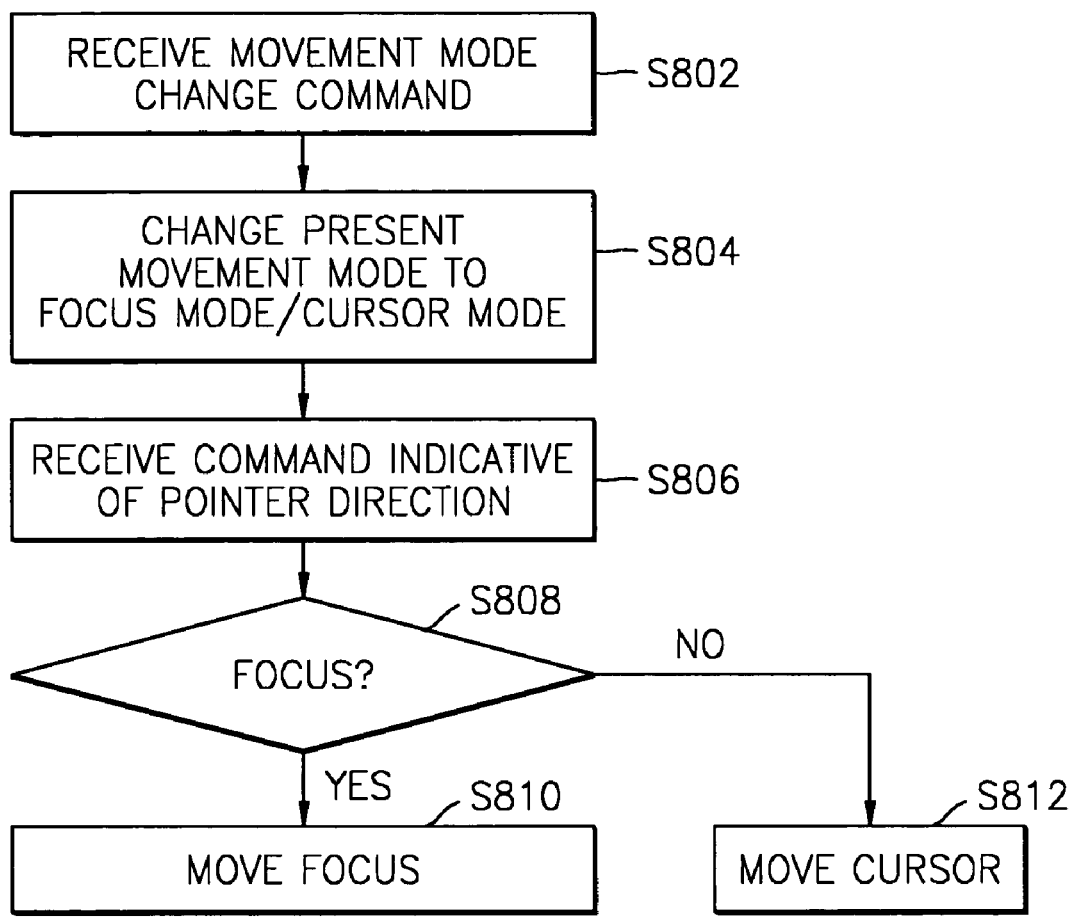
FIG. 8 is a flowchart illustrating a method of controlling a pointer movement mode.

FIG. 8 is a flowchart illustrating a method of controlling movement of a pointer according to an exemplary embodiment of the present invention.

A main body, for example, an AV system as shown in FIG. 2, which is controlled by the remote control device 400 of FIG. 4, includes a receiver that receives an infrared ray signal transmitted from the remote control device 400 and a microprocessor that decodes the received signal and performs an operation corresponding to the received signal. In particular, the microprocessor controls a movement mode of the pointer in response to a command indicative of a direction and a movement change command made using the remote control device 400. The movement mode of the pointer is set as one of the focus mode and the cursor mode.

The focus mode is a mode in which the focus is moved only on selectable objects as described with reference to FIG. 5, and the cursor mode is a mode in which the pointer is moved to a desired point of a screen irrespective of the position of an object as described with reference to FIG. 6.

Referring to FIG. 8, a movement mode change command of changing a mode of moving the pointer is transmitted to the main body (S802). Next, a currently set movement mode is changed to the focus mode or the cursor mode. (S804)

The movement mode of the pointer for the main body is initially set to the focus mode. When a user desires to change the focus mode to the cursor mode, the user presses the movement mode change button 412 on the remote control device 400. Then, a movement mode change command is transmitted to the main body and the main body receives the command and changes the focus mode to the cursor mode.

Next, a command indicative of the direction of pointer is transmitted to the main body (S806).

Next, it is checked whether the set mode is the focus mode or the cursor mode (step S808).

If the set mode is the focus mode, an item positioned in a direction indicated in the received command indicative of the direction of pointer is searched for from selectable items and the pointer is moved to the searched item (step S810).

If the set mode is the cursor mode, the pointer is moved by a unit distance in the direction indicated in the received command indicative of the direction of pointer (step S812).

A cursor movement mode is available in a hypermedia or data broadcast. For instance, ClickVideo, which is a hypermedia technique, enables additional information regarding a particular object of a moving image to be easily obtained just by clicking the additional information using a mouse. For instance, when a user selects any part of the product displayed in the moving image, the hypermedia technique allows displaying of the details of the selected product. The cursor movement mode is activated by selecting the movement mode change button 412.

In the case of the hypermedia broadcast, a cursor is not initially displayed on a screen. When pressing the movement mode change button 412, the cursor is displayed on the screen and is moved in the right, left, upper, and lower directions by handling the direction buttons 404.

As described above, a remote control device according to the present invention allows movement of a pointer to a desired point of a screen without a mouse-type pointing apparatus, otherwise used when moving a cursor in the screen using a related art mouse. Accordingly, it is possible to manufacture the remote control device at a lower cost.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A remote control device comprising:
   a direction indicating means for instructing a moving direction of a pointer to point out an object;
   a selection indicating means for instructing selection of the object pointed out by the pointer which is moved by the direction indicating means;
   a movement mode change indicating means for indicating a change of a manner of moving the pointer in response to an electrical signal corresponding to the moving direction instructed by the direction indicating means; and
   a modulation means for generating electric signals in response to a selection made by the direction indicating means, the selection indicating means, and the movement mode change indicating means, wherein the change in the manner of moving the pointer is a change between moving in a continuous movement and moving in a focus movement, wherein the focus movement moves the pointer only to positions having a selectable object.

2. A method of controlling movement of a pointer on a screen, in response to a command indicative of pointer direction provided by a remote control device and a pointer movement mode change command that allows change between a focus mode and a cursor mode, the method comprising:

changing the pointer movement mode between the focus mode and the cursor mode when the movement mode change command is received;

receiving the command indicative of pointer direction;

searching for an object, which is positioned in a direction indicated in the received command indicative of pointer direction, from selectable items when the set movement mode is the focus mode, and moving the pointer to the searched object; and moving the pointer by a predetermined unit distance in the direction indicated in the command indicative of pointer direction when the set movement mode is the cursor mode.

3. A remote control unit for controlling a device and also selecting objects displayed on a screen of the device, comprising:

a main function button unit for receiving an input to control functions of the device;

a direction button unit for receiving an input to move a pointer on the screen of the device, said movement based on one of a focus movement mode and a cursor movement mode;

a movement mode change button unit for receiving an input to change between the focus movement mode and the cursor movement mode; and a controller that controls the main function button unit, the direction button unit, and the movement mode change button unit, and generates signals useable with the device based on the respective inputs of the main function button unit, the direction button unit, and the movement mode change button unit;

wherein the controller interfaces with the movement mode change button unit to determine whether movement of the pointer is to be in the focus movement mode or the cursor movement mode, and when the input of the direction button unit received, the controller provides one or more of the signals to the device that instructs the device to move the pointer according to the determined focus movement mode and cursor movement mode, wherein the pointer points to only selectable objects on the screen of the device when in the focus movement mode.

4. A method for remote control of a device and for selecting objects displayed on a screen of the device, comprising:

receiving a movement mode selection indicating one of a focus movement mode and a cursor movement mode;

receiving an input indicating a direction to move a pointer;

generating signals useable with the device to move the pointer on the screen based on the selected movement mode; and transmitting the generated signals to the device to move the pointer on the screen, wherein the pointer points to only selectable objects on the screen of the device when in the focus movement mode.

5. The method of claim 4, wherein the cursor movement mode permits the pointer to move to any point on the screen of the device.

6. A audio/video system of controlling movement of a pointer on a screen, in response to a command indicative of pointer direction provided by a remote control device and a pointer movement mode change command that allows change between a focus mode and a cursor mode, the system comprising:

a remote control receiver receiving the command indicative of pointer direction and the pointer movement mode change command; and a controller changing the pointer movement mode between the focus mode and the cursor mode when the movement mode change command is received; searching for an object, which is positioned in a direction indicated in the received command indicative of pointer direction, from selectable items when the set movement mode is the focus mode, and moving the pointer to the searched object; and moving the pointer by a predetermined unit distance in the direction indicated in the command indicative of pointer direction when the set movement mode is the cursor mode.

7. The audio/video system of claim 6, wherein in the case of hypermedia broadcast, a cursor is not initially displayed on a screen and, when the movement mode change command is received, the cursor is displayed on the screen.

* * * * *